March 10, 1925.
D. GUELBAUM
AUTOMATIC PNEUMATIC WEIGHING SCALE
Filed Nov. 3, 1923
1,528,976
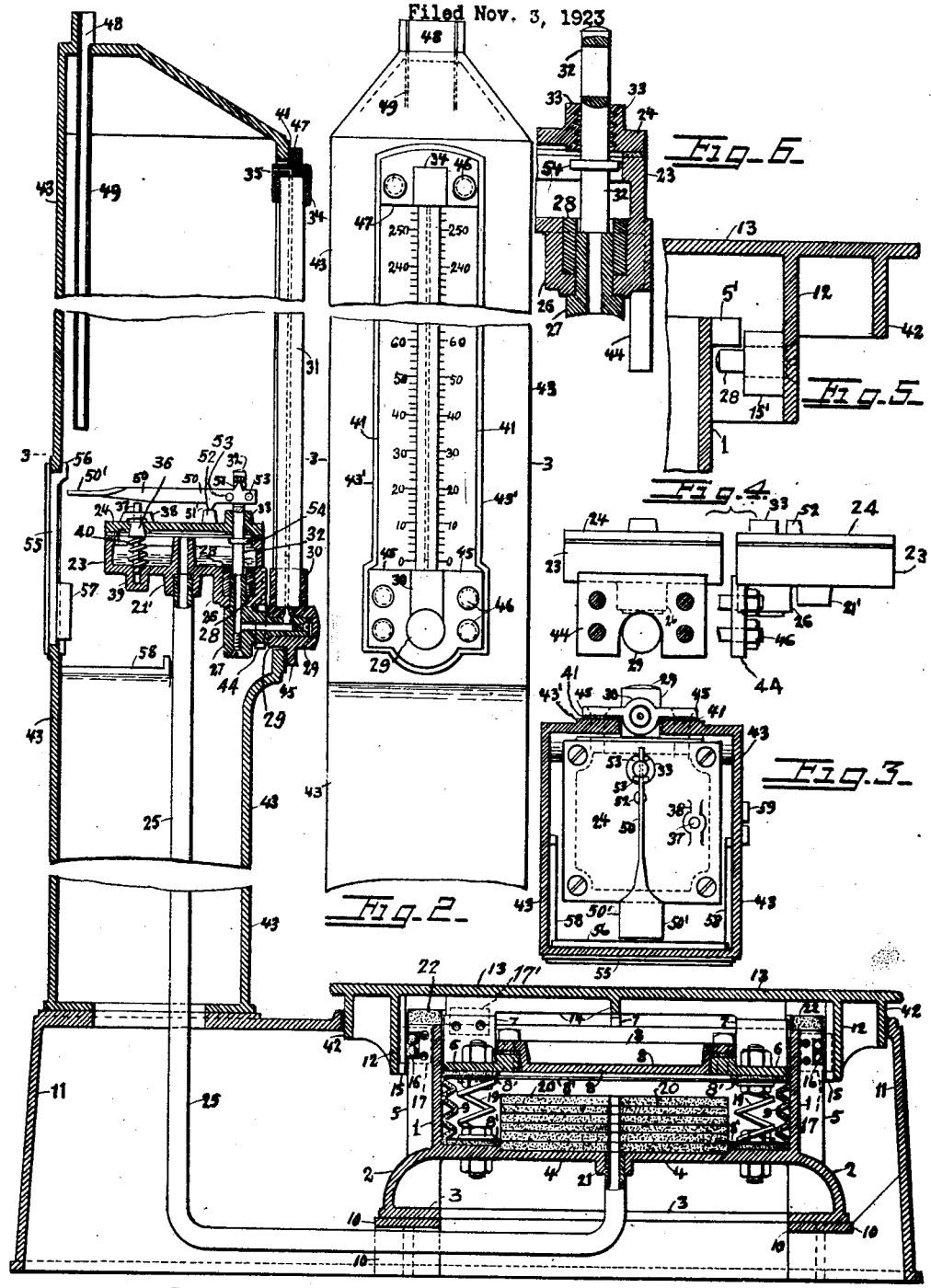
INVENTOR
David Guelbaum.

Patented Mar. 10, 1925.

1,528,976

UNITED STATES PATENT OFFICE.

DAVID GUELBAUM, OF SYRACUSE, NEW YORK.

AUTOMATIC PNEUMATIC WEIGHING SCALE.

Application filed November 3, 1923. Serial No. 672,592.

*To all whom it may concern:*

Be it known that I, DAVID GUELBAUM, a citizen of the United States, and a resident of Syracuse, in the county of Onondaga and State of New York, have invented a certain new and useful Automatic Pneumatic Weighing Scale, of which the following is a specification.

My invention of an automatic pneumatic weighing scale has for its object the automatic operation of the scale by a coin dropped into a slot and the indication of the weight by means of a mercury film within a glass pipe, similar to a thermometer or a barometer. And reference is here had to the applicant's prior application for a universal pneumatic weighing scale, filed April 11, 1923, Ser. No. 631,354, the present application retaining the original basic features, with changes and additions for its automatic operation in public places.

My invention comprises the above novel features, embodied in combinations and constructions as hereinafter set forth and claimed, and as illustrated in the accompanying drawings, in which similar characters denote the same parts in all the views.

Fig. 1 is a vertical section of my pneumatic weighing scale.

Fig. 2 is a front view of the upper part, showing the mercury pipe with the graduation plate.

Fig. 3 is a cross section of the upper part, showing the top of the mercury well with the lever operated by the coin impact.

Fig. 4 is a rear and side view of said mercury well, showing the fastening bracket with the bolts.

Fig. 5 shows a provision to prevent lifting the weighing platform off the scale.

Fig. 6 is a magnified detail of the coin operating mechanism.

As seen on Fig. 1, 1 is a stationary cylinder with an open top and a widened out bottom 2 and inside flange 3 and with the intermediate blank bottom 4 and the outside vertical ribs 5.

Inside of said stationary cylinder 1 is telescoping the movable flange 6 with its radial vertical ribs 7 on top and having a hole in centre closed by the fastener on cover 8.

Between the stationary blank bottom 4 and the telescoping flange 6 is placed and fastened to them with bolts the corrugated flanged cylinder 9, forming a closed contractible air space inside the stationary cylinder 1, as shown on Fig. 1. The corrugated cylinder 9 may be made of any pliable impervious to air fabric, like rubber, or of thin corrugated metal plate easily yielding to contraction and expansion. To keep constant the area of the movable flange 6 exposed to the varying air pressure within the closed air space, the plate rings 8' are introduced, fastened to the flanges of the corrugated cylinder by the bolts, as shown.

The stationary cylinder 1 is resting with its inside flange 3 on the brackets 10 cast on inside of the hollow pedestal 11, as shown on Fig. 1.

Outside the stationary cylinder 1 is telescoping the movable cylinder 12, having an open bottom and a closed flat top 13, serving as a weighing platform, its horizontal inner ribs 14 resting on the ribs 7 of the movable flange 6, and its vertical inner ribs 15 being close to and opposite the outer ribs 5 of the stationary cylinder 1, as shown on Fig. 1.

To prevent friction and binding between the movable ribs 15 and the stationary ribs 5, the latter are notched out at the top and the bearing balls 16 are introduced, held in position by the clips 17 fastened to the ribs 5 on either side, as shown on Fig. 1. These clips also prevent the movable cylinder 12 from turning relative to the stationary cylinder 1. Likewise, the clips 17' fastened to either side of one of the vertical ribs 7 on the movable flange 6 and engaging and resting on rib 14 of the platform 13, Fig. 1, prevent the movable flange 6 from turning relative to the stationary cylinder 1.

The lugs 5', shown on Fig. 5, cast on the top of cylinder 1 outside, and the bosses 15' cast on cylinder 12 inside with the screwed in pins 18, are provided to prevent lifting the cylinder 12 and platform 13 off the scale body.

To hold the movable cylinder 12 and the flange 6 suspended and the corrugated cylinder 9 normally inflated, the springs 19 are introduced into the closed air space held fast between the bolt heads, as shown on Fig. 1.

Into the closed air space of the contractible cylinder 9 are introduced the rubber or cardboard plates 20 with a hole in centre for air passage to the bottom nozzle 21. By increasing or decreasing the number of these plates the closed air space volume is adjusted to suit the desired maximum load to be weighed. Likewise, the plate ring 22, resting on top of the stationary cylinder 1, is provided for adjusting the drop of the platform 13 coming to rest on top of this plate ring, to suit the desired maximum load.

The weight of the load indicating mechanism consists of the closed mercury well 23 with the air tight cover 24, shown on Figs. 1, 3, 4 and 6, with the bottom nozzle 21′ projecting inside to near the cover and connected by the flexible pipe 25 with the nozzle 21 in centre of the blank bottom 4 of the stationary cylinder 1. Thus the air space above the mercury surface within the closed well 23 forms a continuation of the closed contractible air space within the corrugated cylinder 9.

The well is also provided at its bottom with the cast on socket 26 into which enters the vertical reduced end of the T-bend 27 held fast by the nut 28, as shown on Figs. 1 and 6. The horizontal reduced end of the T-bend 27 enters the hub 29 provided with the cast on vertical socket 30, holding the upright glass mercury pipe 31, whose bottom is thus connected with the mercury in the well 23. The bottom of the T-bend 27 and its horizontal end are plugged up by screwed in pins, as shown on Fig. 1, while its top is open to the mercury entrance.

Normally this mercury entrance to the top of the T-bend 27 is closed by the dowel pin 32, Figs. 1 and 6, resting on top of the T-bend and provided with the shoulder 54 in the middle and with a slot at its top and passing through the hub 33 on the cover 24. But when the dowel pin jumps up under the impact of the dropping coin, as will be explained later, the excess air pressure in the entire closed contractible air space, caused by the load on the platform 13, will keep the dowel pin up and force the mercury through the T-bend into the upright glass pipe 31 to the full height proportional to the excess pressure caused by the load.

When the load is removed and the platform 13 rebounds upward the pressure in the mercury well drops down, momentarily, to a little below the outside atmosphere, and the dowel pin 32 drops down and closes the T-bend entrance. The top of the glass pipe 31 is covered by the socket 34 provided with the air channel 35 communicating with the pipe interior above the mercury film with the outside atmosphere all the time, as shown on Fig. 1.

The mercury well 23 is also provided inside with the small valve plug 36 mounted in the cover 24 with its stem 37 passing through the yoke 38 cast on the cover and into the small socket 39 in the bottom of the well and is held up close to its seat by the spring 40. By pushing down the stem 37 the entire closed air space communicates with the atmosphere and assumes the outside atmospheric pressure; upon releasing the stem 37, the spring 40 instantly restores the plug 36 to its seat, and the entire air space within the well and in the corrugated cylinder becomes closed again. The location of the yoke 38 in plan is shown on Fig. 3.

The action of the pneumatic scale is as follows:

When there is no load on the platform 13, Fig. 1, the weight of the movable flange 6 with the cylinder 12 is balanced by the springs 19; within the closed air space the pressure is the same as that of the outside atmosphere, and the mercury level in the well and in the glass pipe will be the same and coincide with the zero mark on the graduation plate 41, Fig. 2.

Should the scale be taken up the top of a mountain, or down the pit of a mine, causing a sudden change of altitude, or in case of a sudden change in temperature, atmospheric pressure within the closed contractible air space may be instantly re-established by pressing down the stem 37 of the spring plug, as previously explained.

Let now a load be placed on the platform 13; it will move down a little and compress the air within the closed air space. The excess pressure over the atmosphere, acting upward on the bottom side of the flange 6, will balance the load.

Assuming for instance that the closed air space has been contracted $\frac{1}{3}^d$, that is, the contracted volume of the closed air space is now $\frac{2}{3}^d$ of what it was before, and that the bottom area of the movable flange 6 exposed to the excess pressure measures 40 sq. inches. Then, the excess air pressure upward amounts to 294 pounds; at ½ contraction of the closed air space volume, the excess pressure upward will double and amount to 588 pounds, which shows the sensitiveness and effectiveness of the pneumatic scale, and the drop of the platform, in practice, will be confined to but a few sixteenths of an inch.

The excess pressure per sq. inch is indicated by the height of the mercury film in the glass pipe, Fig. 2, over the zero mark, and the figures on the graduation plate 41, giving the corresponding weights of the loads, are recorded from actual test weights and include also the weight corresponding to the slight additional pressure upward due to the slight additional contraction of the balancing springs.

The ratio of the surface area of the mercury within the well to the cross section of the mercury film in the glass pipe is more than 1000 to 1, so that the level of the mercury in the well is practically constant and always coinciding with the zero mark on the graduation plate within $\frac{1}{64}$th of an inch.

The pneumatic scale body is hidden and housed inside the hollow pedestal 11, fastened to the brackets 10 cast on inside the pedestal, as shown on Fig. 1. To guard and protect the scale body from outside interference the platform 13 is provided with the cast on rim 42 fitting into a corresponding opening in the top of the pedestal, as shown on Fig. 1.

To the top of the pedestal 11, over an opening in same, is fastened the hollow stanchion 43, shown on Figs. 1, 2 and 3. To the front wall 43′ of the stanchion are fastened together the mercury well 23 and the hub 29 with the socket 30 by means of the cast on brackets 44 and 45, joined together by the countersunk bolts 46, as shown on Figs. 2, 3 and 4. Likewise is fastened the top socket 34 with its cast on bracket 47, on top of the glass pipe 31, with the graduation plate 41 clamped tight to the front wall 43′ of the stanchion, a suitable slot being provided in the front wall 43′ to let through the hub 29 with the sockets 30 and 34 and the glass pipe 31, all these accessories of the pneumatic scale body thus forming a compact part of the stanchion 43, as shown on Figs. 1, 2 and 3.

The top of the stanchion 43 is slanted, as shown on Figs. 1 and 2, and is provided with the projecting lip and slot 48 and with the inner chute 49 for dropping in of the coin. The bottom of the chute 49 terminates just over the flattened end 50′ of the lever 50, its other end passing through the slot in the dowel pin 32 on which it presses upward with its upper toothed projections 51 and resting with its lower tooth projection 51′, as a fulcrum, on the boss 52 cast on top of the well cover 24, as shown on Figs. 1 and 6.

The screw pins 53, shown on Figs. 1 and 3, are provided to hold the lever 50 confined to the slot in the dowel pin 32. As shown on Fig. 6, the hub 33, through which the dowel pin 32 passes, is provided inside with triangular grooves filled with lubricant, so that friction is reduced and air prevented from leaking through.

Normally, by its own weight, the dowel pin 32 stays down, as shown on Fig. 1, keeping closed the mercury inlet opening to the upper end of the T-bend 27. When a load is placed on the platform 13 and a coin dropped into the chute 49, the impact of the coin upon the flattened end 50′ of the lever 50 loosens the dowel pin 32 from its seat, and the excess air pressure in the well, caused by the load on the platform 13, will push it upward till its shoulder 54 touches the hub 33, and forces the mercury through the T-bend 27 into the glass pipe 31 to the full height of the excess pressure proportional to the load.

When the load is removed and the platform 13 rebounds upward, the pressure in the well, momentarily, falls down a little below the atmospheric pressure, and the dowel pin 32 drops quickly down to its seat, closing the upper end of the T-bend 27.

The stanchion 43 is provided in its rear wall with the hingeless door 55, having the ledge 56 cast on at its top inside and the lock 57 fastened at its bottom. When locked, as shown on Fig. 1, the door 55 is held fast in the wall opening. When its bottom is unlocked it is easily pulled out of the wall opening.

The ledges 58, shown on Figs. 1 and 3, cast on the side walls inside the stanchion, are provided for supporting a receptacle, like a bag or box, for the dropping coins.

The screw plug 59 in the side wall of the stanchion, shown on Fig. 3, is provided for access to the stem 37 of the spring plug valve mounted in the mercury well cover 24, for instant communication of the closed air space with the outside atmosphere, when desired, as previously explained.

What I claim is:

1. An automatic pneumatic weighing scale, comprising a hollow pedestal with cast on brackets inside and having one large and one small opening on top, a pneumatic scale body housed and supported on said brackets inside of said hollow pedestal and passing through its large opening on top, a hollow stanchion fastened over the smaller opening on top of said pedestal and carrying inside the closed mercury well connected by flexible tubing to the bottom of said pneumatic scale body and having fastened to its front wall outside the sockets connected by tube to the bottom of said mercury well and provided with the glass pipe with the mercury film and the weight indicating graduation plate and provided at its top with a slot and a fastened on chute inside for dropping in of the operating coin, means for opening the mercury inlet to the bottom of said glass pipe by the dropping coins, substantially as and for the purpose specified.

2. An automatic pneumatic weighing scale, comprising a hollow pedestal with an open bottom and a flat top having one large and one small opening and provided with cast on brackets inside, a pneumatic scale body housed and supported inside of said hollow pedestal and passing through its large opening on top, a hollow stanchion fastened over the smaller opening on top of said pedestal and carrying inside the mercury well with connecting tube for said pneumatic scale body and having fastened to its front wall outside the sockets connected by tubing to the bottom of said mercury well and holding the glass pipe with the mercury film and the weight indicating graduation plate and provided at its top with a slot and a fastened on chute inside for the dropping in of coins, means for opening the mercury inlet to said glass pipe by the dropping coins, substantially as and for the purpose set forth.

3. An automatic pneumatic weighing scale, comprising a hollow pedestal with cast on brackets inside and having one large and one small opening on top, and a pneumatic scale body with a widened out bottom flanged inside and fastened to the brackets inside of said pedestal and having a rim cast on the bottom side of its movable weighing platform fitting the large opening on top of said pedestal, a hollow stanchion fastened over the smaller opening on top of said pedestal and carrying inside the mercury well with connecting tube for said pneumatic scale body and having fastened to its front wall outside the sockets holding the glass pipe with the mercury film and the weight indicating graduation plate and provided at its top with a slot and a fastened on chute inside for the dropping in of coins, means for opening the mercury inlet to said glass pipe by the dropping coins, substantially as and for the purpose described.

4. An automatic pneumatic weighing scale, comprising a hollow pedestal with cast on brackets inside and having one large and one small opening on top, a pneumatic scale body housed and supported inside of said hollow pedestal and passing through its large opening on top, and a hollow stanchion with a slanted closed top and an open bottom flanged inside and fastened over the smaller hole on top of said pedestal and provided with a longitudinal slot in its front wall for holding fast the mercury well with its connecting tubes and the glass pipe with the graduation plate accessory to said pneumatic scale body and having a projecting lip and a slot at its top with a fastened on chute inside for the dropping in of the operating coins and provided with an opening in its rear wall closed by a hingeless door having a ledge cast on at its top inside and a lock fastened at its bottom and having ledges cast on inside to its side walls for supporting a receptacle for the dropping coins, means for opening the mercury inlet to said glass pipe by the dropping coins, substantially as and for the purpose specified.

5. An automatic pneumatic weighing scale, comprising a hollow pedestal with cast on brackets inside and having one large and one small opening on top, a pneumatic scale body housed and supported inside of said hollow pedestal and passing through its large opening on top, a hollow stanchion fastened over the smaller opening on top of said pedestal and carrying inside the closed mercury well with its connecting tubes for said pneumatic scale body and having fastened to its front wall outside the sockets holding the glass pipe with the mercury film and the weight indicating graduation plate and provided at its top with a slot and a fastened on chute inside for the dropping in of coins, and a dowel pin with a shoulder in the middle and passing through a hub on the cover of said closed mercury well inside of said hollow stanchion and closing with its bottom end the mercury inlet opening to said glass pipe with the mercury film fastened in the longitudinal slot in the front wall of said stanchion and having a slot at its upper end with one end of a lever fulcrumed with its projecting tooth on said mercury well cover passing through said slot of the dowel pin and pressing on it upward with a projecting tooth and held confined to said slot by two screwed in pins either side of the dowel pin the other end of said lever being flattened out and exposed to the impact of the dropping coins from the chute inside of said stanchion thereby raising said dowel pin and opening the mercury inlet to said glass pipe and indicating the weight of the load, substantially as and for the purpose set forth.

In testimony whereof, I have hereunto signed my name, at Syracuse, in the county of Onondaga, and State of New York, this 2 day of November, 1923.

DAVID GUELBAUM.